United States Patent [19]

Parker et al.

[11] 4,192,697

[45] Mar. 11, 1980

[54] HOT APPLIED COATINGS

[75] Inventors: William D. Parker, London; Harry M. Smith, North Cheam; Margaret P. Edwards, Orpington, all of England

[73] Assignee: Winn & Coales (Denso) Limited, London, England

[21] Appl. No.: 886,832

[22] Filed: Mar. 15, 1978

[30] Foreign Application Priority Data

Mar. 25, 1977 [GB] United Kingdom ............... 12753/77

[51] Int. Cl.$^2$ ............................................. B65H 8/00
[52] U.S. Cl. ................................... 156/188; 138/144; 156/195
[58] Field of Search .............................. 186/187–188, 186/195, 392; 138/129, 144–146, 150; 420/36, 222

[56] References Cited

U.S. PATENT DOCUMENTS

| 3,190,780 | 6/1965 | McNulty et al. ................. 156/392 X |
| 3,723,045 | 7/1974 | Hielema ................................. 156/188 |
| 3,761,335 | 9/1973 | Cichoski et al. ..................... 156/187 |

FOREIGN PATENT DOCUMENTS

| 377650 | 1/1931 | United Kingdom ..................... 156/188 |
| 1078559 | 8/1967 | United Kingdom . |

OTHER PUBLICATIONS

"New Concept Wraps Joint in One Minute", *Pipe Line Industry*, Mar. 1973, p. 51.
"Hot Applied Coatings for Pipe Line Protection", *Pipe Line Industry*, Mar. 1977, pp. 40–42.

*Primary Examiner*—David A. Simmons
*Attorney, Agent, or Firm*—Bacon & Thomas

[57] ABSTRACT

A method for forming an adherent protective coating on articles, particularly pipes for burial in the ground where they will be subject to corrosion, which comprises wrapping a hot impregnated fabric strip spirally around the article, the said fabric, which is preferably of glass fibre, being impregnated with a hot, molten adhesive, e.g. coal tar or bitumen and forming a sheathing of a plastics material bonded to the impregnated fabric, preferably by winding a strip of polyvinyl chloride sheet over the wrapped article.

10 Claims, No Drawings

HOT APPLIED COATINGS

The present invention relates to the coating of articles, e.g. for protection from corrosion. The coating process of the invention may be applied to elongate e.g. cylindrical articles, e.g. pipes or cables.

DESCRIPTION OF THE PRIOR ART

Hot applied asphaltic bitumen and coal tar coatings for pipes are usually applied by the method known as "flood coating", which consists of cleaning and priming the external surface of the pipe and then passing it under a coating head and at the same time rotating it and moving it in a longitudinal direction. A stream of hot coating compound is released on to the top surface at one end of the pipe and while the latter progresses along one or more strips of reinforcing fabric are fed into the molten compound and pulled evenly round by the spiral movement of the pipe from one end to the other. The most common form of fabric reinforcement is glass fibre felt, generally in widths between 75 and 450 mm, depending upon the diameter of the pipe and it is either untreated or impregnated with a bituminous impregnant which has been allowed to cool. The coating materials most widely used and which are designed to withstand the widest range of climatic temperatures are oxidised asphaltic bitumen with, e.g. 25/35%, or without inert fillers such as powdered talc or slate and modified coal tar pitches, with or without the addition of such fillers. Modified coal tar pitches are made by the hot digestion of powdered coal in coal tar in order to reduce its susceptibility to temperature changes. Typical properties of such coating materials suitable for withstanding high atmospheric temperatures are:

|  | ring and ball softening point °C. | needle penetration 100g/5secs/25° C. | application temperature °C. |
|---|---|---|---|
| bitumen coating BS4147: 1967 | 100/130 | 5/35 | 220/240 |
| coal tar coating, BS4164: 1967 | 105/130 | 0/20 | 225/260 |

Such coatings have the following disadvantages in use:
  (i) In order to wet the reinforcing fabric and develop adhesion to the metal surface the application temperatures are as high as possible. This requires great care to avoid overheating and the compound may only be kept at the application temperature for a limited time owing to its properties changing. Fuming from the evolution of volatile matter constitutes a major problem.
  (ii) The flood coating technique is necessarily unreliable and produces a coating of varying thickness, containing bubbles, cracks and other defects in the coating compound. In order to improve the protection afforded it is common practice to introduce two or more layers of fabric reinforcement to make the final thickness of the coating appreciably greater than would otherwise would be necessary e.g. 4 mm or more. In this way defects in one layer of coating are sealed off by the second layer.
  (iii) In order to achieve the best possible adhesion of the coating compound to the pipe the former is applied at the highest possible temperature but even then, especially in the case of asphaltic bitumen coatings, the viscosity may be undesirably high and bubbles arise from the presence of occluded moisture on the surface of the fabric fibres and for other reasons.
  (iv) To have the necessary resistance to flow on exposure to sunlight prior to burial, which can raise the surface temperature to 80° C., coatings tend to be brittle at low temperatures above or below freezing point, and are susceptible to damage from impact at such temperatures during storage, transit and handling.

Because of the known limitations of traditional asphaltic bitumen and coal tar coatings use has been made of extruded polyethylene coatings. These consist of high density or low density polyethylene extruded longitudinally through a crosshead extruder over an adhesive mastic previously applied to the pipe surface. This method of coating is widely used for pipes up to 450/500 mm diameter. For larger diameters a preferred method of application of the polyethylene coating is to extrude the latter spirally over the pipe in such a manner that adjacent layers of the hot extruded polyethylene weld together. United States Patent Specification No. 3823045 illustrates this method of protection. Extruded polyethylene coatings of this type require expensive plastics extrusion equipment and suffer from the disadvantage that the polyethylene sheathing is rigid rather than plastic in its consistency and has a much higher co-efficient of thermal expansion than a steel pipe to which it is applied. Consequently differential movement of the protective coating in both the transverse and longitudinal directions can occur, with the creation of cavities between the polyethylene and the steel surface in which moisture can accumulate and cause corrosion of the steel pipe. Differential movement between the polyethylene coating and the pipe when exposed to sunlight restricts the use of this method of protection in tropical latitudes.

BRIEF DESCRIPTION OF THE INVENTION

The present invention provides a method for forming a protective coating on an article, e.g. a pipe, which method comprises wrapping a hot impregnated fabric strip spirally around the article, which fabric strip has been impregnated with a hot molten adhesive, and forming a sheathing of a plastics material bonded to the impregnated fabric wrapping.

Usually the article is a metal, e.g. steel or cast iron, pipe or a non-metallic, e.g. concrete, pipe.

Preferably the fabric on to which the adhesive is impregnated and coated is a glass fibre felt, suitably having a width of from 50 to 450 mm.

It is highly desirable that the fabric strip be coated and impregnated with the adhesive so that fibres of the fabric do not appear at either major surface of the strip.

DETAILED DESCRIPTION OF THE INVENTION

The adhesive may be impregnated into the fabric by passing the fabric through a bath of the hot molten adhesive. Preferably, doctor knives are provided between which the fabric is passed on emerging from the bath, to remove excess adhesive and to produce a uniform thickness of the desired amount.

The thickness of the coated fabric may suitably be from 0.75 to 2.00 mm.

The coated fabric is preferably wound spirally round the article to be coated with adjacent turns overlapping so that the entire outer surface of the article is covered.

The plastics sheathing material is preferably a plastics sheet in strip form e.g. a plasticised polyvinyl chloride (pvc) sheet, which may be of a similar width to the fabric. A convenient thickness for such a sheet is from 0.1 to 0.5 mm. The composition of the pvc compound should be selected to avoid any harmful interaction with the adhesive, e.g. a non-migratory plasticiser may be used.

The strip of plastics sheet may be wound spirally round the article over the hot impregnated fabric. Suitably the helix angle of the spiral winding is such as to give an overlap of 10% of the width of the strip of plastics sheet. If a thicker layer of sheathing is desired, e.g. greater than 0.5 mm, this may conveniently be achieved by providing a 50% overlap, thus yielding an overall double thickness.

The article preferably has a layer of primer applied, before being wrapped with the fabric, to promote adhesion of the hot adhesive. Examples of such primers are solutions of bitumen, coal tar, or chlorinated rubber. Other compounds may be used which are compatible with the adhesive.

The adhesive is preferably an asphaltic bitumen or coal tar coating compound. Preferably such a bitumen or coal tar coating compound is softer than those conventionally used in pipe coatings. For instance, an asphaltic bitumen coating compound may have a softening point between 55° and 110° C. and a penetration of from 15 to 50. It may consist of oxidised bitumen or a blend of oxidised bitumen with residual bitumen or petroleum flux oil. Similar characteristics are attainable in a modified coal tar pitch, formed by hot digestion of powdered coal in coal tar pitch to reduce its susceptibility to temperature changes. If necessary, the modified coal tar pitch may be blended with unmodified pitch or coal tar oil to give the desired consistency.

The bitumen or coal tar adhesive may contain inert mineral filler, preferably 25% to 35% of, e.g. powdered talc or slate.

Asphaltic bitumen adhesive may have incorporated in it a minor proportion of an additive such as rubber, a tackifier resin or polyethylene to diminish its susceptibility to change in viscosity with temperature and to improve adhesion, particularly to the plastics sheathing. A suitable preferred rubber is unvulcanised natural rubber.

Coal tar adhesives may incorporate rubber and synthetic resin additivies e.g. such as are disclosed in our British Patent Specification No. 962967.

Other adhesives that may be used include those based on petroleum waxes or blends of petroleum wax or oil with a polymer such as are described in our British Patent Specification No. 1361970. The adhesive used preferably has a ring and ball softening point of 55° to 110° C.

The viscosity of the molten adhesive is sufficiently low to allow the complete impregnation of the adhesive into the fabric.

Two separate layers of fabric impregnated with adhesive may be applied successively to the pipe and these two layers may if desired differ in composition. For example the first layer may be a relatively soft asphaltic bitumen compound, e.g. with a penetration of 50, for better adhesion to the pipe and the second layer may have a higher viscosity, e.g. a pentration of 20, for better resistance to impact and mechanical damage.

A thin film of hot adhesive, generally of the same type, but not necessarily of the same consistency, as the adhesive with which the fabric is impregnated, may be applied to the under surface of the strip of pvc or other plastics sheet immediately before application by spiral winding on to the coated article, in order to improve adhesion thereto and to provide an adhesive seal between adjacent laps of the sheathing. Such a thin film of hot adhesive may be applied by roller coating.

The article may be heated, e.g. to 50° C., prior to being coated with adhesive impregnated fabric. Preheating of the pipe diminishes chilling of the hot adhesive on contact and enables the latter to be applied at lower temperatures than would otherwise be necessary and this may increase the reliability of the adhesive bond between coating and pipe.

The present invention includes articles coated in accordance with the process described above.

The present invention includes an article having bonded to its outer surface an inner wrapping of fabric impregnated with hot adhesive and an outer sheathing of plastics material bonded to the inner layer which plastics outer sheathing is preferably a spiral winding of pvc sheet.

An advantage of the preferred embodiments of this invention is that the impregnation of the fabric in a bath of adhesive is more effective than flood coating in that the period of immersion in the bath ensures that all moisture in the fabric is removed and the adhesive coating applied to the pipe is of an even thickness and free from bubbles and other defects. The temperature at which the adhesive makes contact with the pipe is more effectively and closely controlled and this promotes better adhesion.

The reduced thickness of the bituminous or other compound and the presence of the outer wrap reduce the tendency to flow at elevated temperatures and thus compensate for the use of a softer coating compound. The use of the plasticised pvc outer wrap applied spirally has the further advantage that, particularly at elevated temperatures, it has a tendency to shrink to a limited degree, thereby imposing a compressive force on the underlying plastic adhesive and making the latter flow and develop the strongest possible bond to the pipe. This is in contrast to a polyethylene outer wrap, whether in the form of a continuous extruded sheath or adhesive tape spirally applied, which tends to relax its tension over a period of time, particularly with rise in temperature, thereby diminishing the pressure on the underlying adhesive compound on the pipe surface.

Continuous sheathings of rigid plastics materials such as extruded polyethylene on metal pipes expand more on heating than do the pipes in both the transverse and longitudinal directions. This can give rise to cavities between the sheathing and the pipe in which water can accumulate and cause corrosion. The coils of a spiral sheathing of pvc do not behave in this manner thus avoiding this danger.

The invention will be better understood from the following Examples

EXAMPLE 1

Coated pipe specimens were prepared for testing in accordance with the method "Cathodic Disbonding of Pipeline Coatings", American Society for Testing and Materials designation: G8-69T. In this test a coated length of pipe has a hole drilled through the coating to expose the underlying metal and the specimen is then immersed in a bath of aqueous electrolyte and subjected to a cathodic potential by connecting it to a magnesium anode also immersed in the electrolyte bath. After the test period the specimens are removed and the coating cut open in the vicinity of the hole previously made in the coating and the extent to which the coating has lost adhesion with the metal in this area is measured. This area is known as the "disbonded area" and to give the best protective performance by the coating the disbonded area should be nil or a relatively small amount.

Asphaltic bitumen coatings of different penetrations were prepared by blending oxidised bitumens with each other or with a soft residual bitumen. Lengths of steel pipe approximately 40 cm long and 50 mm in diameter were cleaned and primed by brush application with a primer consisting of a solution in a volatile organic solvent of approximately 40% by weight of the bitumen to be used in the subsequent coating. After the primer had dried by evaporation of the solvent, strips of coated fabric were prepared by drawing through a bath of the bitumen blend at 120°/150° C. glass fibre felt of the type commonly used for pipe coating reinforcement. It was 50 mm wide, of a nominal thickness of 0.30 mm, and a weight of 27 grams per square meter. The impregnated and coated strip upon emerging from the bath had a thickness of approximately 1.3 mm and was immediately applied spirally round the primed pipe, with an overlap between adjacent turns of approximately 15 mm. A second specimen was prepared in an identical manner from the same coating and immediately after application of the impregnated coated fabric to the pipe an overwrapping of pvc strip was applied spirally over the hot bitumen coating. The pvc was of a flexible plasticised grade, 0.25 mm thick, 50 mm wide, and the same overlap was used as for the coated fabric strip.

The above procedure was repeated using a bitumen coating compound of different penetration and after drilling a hole in the coating of each specimen the 4 lengths of coated pipe were placed in the electrolyte bath and the cathodic disbonding test carried out in accordance with the specification for the above test method. The test was continued for 30 days the specimens removed and examined with the following results:

| Bitumen Coating | | Disbonded Area, cm$^2$ | |
|---|---|---|---|
| ring and ball softening point (BS 4147: 1967) | needle penetration 0.1mm/25° C. (BS 4147: 1967) | No Overwrapping | pvc Overwrapping |
| 58 | 50 | 1.2 | nil |
| 100 | 15 | greater than 50 | nil |

In both cases the specimen protected with the pvc overwrapping in accordance with the invention showed no loss of bond whereas the specimens coated in the conventional manner without the pvc overwrapping showed some loss of bond and were thus inferior in their protective qualities.

EXAMPLE 2

Test specimens of coated pipes were prepared as in Example 1 with the same glass fibre felt reinforcement and pvc overwrapping but using a coal tar compound and a chlorinated rubber primer complying with the requirements of BS 4164:1967 type B. The coal tar coating consisted of a modified coal tar pitch blended with high boiling coal tar oil and the test was carried out for 30 days with the following results:

| Coal Tar Coating | | Disbonded Area, cm$^2$ | |
|---|---|---|---|
| ring and ball softening point °C. (BS 4164: 1967) | needle penetration 0.1. mm/25° C. (BS 4164: 1967) | No Overwrapping | pvc Overwrapping |
| 85 | 25 | 2.5 | nil |

The use of the pvc overwrapping thus gives enhanced resistance to cathodic disbonding when applied over a coal tar coating in a similar manner to over the bitumen coating in Example 1.

EXAMPLE 3

Specimens were prepared in a similar manner to Example 1 except that a different grade of bitumen was used and the primer consisted of a solution of this bitumen in a volatile hydrocarbon solvent. In this case a thin layer of rubber-bitumen adhesive approximately 0.1 mm thick was applied hot to the underside of the pvc overwrapping as the latter was applied spirally on to the still warm recently applied bitumen coating. The adhesive was made from 90% bitumen, 8% of a latex of unvulcanised natural rubber (60% solids) and 2% of high viscosity polybutene. The bitumen compounds used were as follows:

| Oxidised bitumen coating | | Rubber-bitumen adhesive | |
|---|---|---|---|
| ring and ball softening point °C. | Needle penetration 0.1 mm/25° C. | ring and ball softening point °C. | needle penetration 0.1 mm/25° C. |
| 85 | 25 | 85 | 76 |

(all determinations in accordance with BS 4147: 1967)Coating temperature: 120/150° C. Coating temperature: 120/140° C.

The use of the hot applied rubber-bitumen adhesive gave a very strong bond at the overlaps in the pvc tape as well as between the latter and the underlying bitumen coating. The robust character of the pipe coating conferred by this type of pvc overwrapping was demonstrated by carrying out conventional static indentation and falling chisel bombardment tests which showed that the coating with the pvc outerwrap was greatly superior in its resistance to mechanical damage compared with the same coating with no outerwrap.

We claim:

1. A method for forming a protective coating on a pipe which method comprises wrapping a hot fabric strip helically over the pipe, the said fabric strip having been previously impregnated with a hot, molten adhesive, and wrapping a strip of plasticized polyvinyl chloride sheet under tension over the hot fabric wrapping to form a sheathing.

2. A method as claimed in claim 1 wherein the pipe is a steel pipe.

3. A method as claimed in claim 1 wherein the fabric strip is a strip of glass fibre felt.

4. A method as claimed in claim 3 wherein the glass fibre fabric is impregnated by being passed through a bath of hot molten adhesive.

5. The process as defined in claim 4, which comprises the steps of passing the fabric strip through a bath of the hot molton adhesive to obtain a completely adhesive-impregnated fabric strip and removing excess adhesive from the fabric strip to obtain an impregnated hot fabric strip of uniform thickness.

6. The process as defined in claim 5, wherein the thickness of the impregnated hot fabric strip is from about 0.75 to 2.00 mm.

7. The process as defined in claim 1, wherein the adhesive is an adhesive having a softening point of between about 55° and about 110° C.

8. A method as claimed in claim 1 wherein the adhesive is selected from the group consisting of asphaltic bitumen, coal tar and rubber containing asphaltic bitumen and coal tar.

9. A method as claimed in claim 1 wherein a first and a second layer of hot impregnated fabric are superposed on the article, the first layer having a softer adhesive impregnated therein than the second layer.

10. A method for forming a protective coating on a steel pipe which method comprises heating the pipe, priming the pipe, wrapping a hot, impregnated glass fibre fabric strip helically around the hot pipe with an overlap between successive turns of at least 10%, the fabric strip having been impregnated by being passed through a bath of molten adhesive selected from the group consisting of asphaltic bitumen coal tar and rubber containing asphaltic bitumen and coal tar, and helically winding under tension a strip of plasticised polyvinyl chloride sheet coated with the said adhesive over the impregnated fabric whilst the fabric is hot to form a sheathing.

* * * * *